United States Patent
Rautiola et al.

[11] Patent Number: 5,949,775
[45] Date of Patent: Sep. 7, 1999

[54] OFFICE COMMUNICATION SYSTEM

[75] Inventors: Markku Rautiola; Jouni Mikkonen, both of Tampere, Finland

[73] Assignee: Nokia Mobile Phones Ltd., Salo, Finland

[21] Appl. No.: 08/697,784

[22] Filed: Aug. 30, 1996

[30] Foreign Application Priority Data

Sep. 29, 1995 [FI] Finland ................................ 954638

[51] Int. Cl.$^6$ .................................................. H04Q 7/24
[52] U.S. Cl. ........................................ 370/338; 370/401
[58] Field of Search ................................ 370/395, 338, 370/400, 401, 315, 328, 452, 349; 455/552, 553

[56] References Cited

U.S. PATENT DOCUMENTS

| | | | |
|---|---|---|---|
| 5,175,758 | 12/1992 | Levanto et al. | 379/57 |
| 5,257,257 | 10/1993 | Chen et al. | 370/18 |
| 5,321,542 | 6/1994 | Freitas | 370/338 |
| 5,473,669 | 12/1995 | Kanada et al. | 379/59 |
| 5,475,689 | 12/1995 | Kay | 370/338 |
| 5,598,407 | 1/1997 | Bud | 370/330 |
| 5,737,333 | 4/1998 | Civanlar | 370/352 |
| 5,771,459 | 6/1998 | Demery | 370/401 |

FOREIGN PATENT DOCUMENTS

| | | |
|---|---|---|
| 2131349 | 5/1995 | Canada . |
| 0 526 106 A2 | 2/1993 | European Pat. Off. . |
| 44 06 505 A1 | 8/1995 | Germany . |

*Primary Examiner*—Chau Nguyen
*Assistant Examiner*—Thinh Vu
*Attorney, Agent, or Firm*—Perman & Green, LLP

[57] ABSTRACT

The invention relates to integrated office communication systems employing a local area network (LAN) for intra-office communications. In the arrangement according to the invention, no other internal networks are needed in the office because computers (10) are connected to the local area network and telephones (5, 7) are either mobile or cordless phones for which there are low-power room-specific base stations (4, 6) in the local area network (LAN). Connections to the outside world are made via a gateway computer (1) and public cellular radio network. Inside the office, the coverage areas of the small base stations (4, 6, 8) are nanocells (4a) of one or a few rooms. A home or small office user has a similar small base station (14) which is cotifected to said local area network via a public communication network (15) and a gateway equipment (13).

15 Claims, 4 Drawing Sheets

OFFICE COMMUNICATION SYSTEM

BACKGROUND OF THE INVENTION

The invention relates to integrated office communication systems which provide, in addition to conventional telephone services, data communication services and other advanced communication services for users in offices and other working environments.

In present-day office work it is necessary to arrange for employees versatile communication connections capable of transmitting speech, faxes, e-mail and other data, which usually is in digital form. Communication is needed inside an office or sinilar working environment for communication between the employees, communication between different offices of a company which may be located in different cities or even in different countries, and for communication between the office and the "outside world". Here and throughout the text to follow, an "office" means a multi-user environment wherein the users in some way belong together and which is physically located in a relatively small area. There has been a tendency in the field toward integrated systems, in which different forms of transmission can be managed as a whole.

A conventional implementation of such an integrated office communication system comprises a private branch exchange and telephones connected to it with twisted-pair lines in order to provide telephone services, and a separate local area network (LAN) which contains applications for advanced communication services and the intelligence needed to use them. The local area network is connected to the private branch exchange via a telephony server which supports the traditional client/server architecture in which the clients are users' computers connected to the local area network. The telephony server can combine e.g. the office's phone call, data, fax, e-mail and voice mail services. In an integrated system, the users may also manage the telephone services via their computer terminals connected to the local area network. The whole integrated office communication system is connected to a public telephone network via the private branch exchange.

FIG. 1 shows an example of a known integrated office communication system, in which users' telephones TP are connected via wired connections to a private branch exchange PBX connected to a public switched telephone network PSTN, and a local area network LAN is connected to it via a telephony server TS. Servers implementing different applications, such as a database server DBS, voice server VS and an e-mail server EMS, are connected to the local area network, as are the users' computers PC The problem associated with this kind of implementation is that even though a user's telephone TP and computer PC are usually located side by side on the same desk, they must have separate wired connections from the private branch exchange PBX on one hand and from the telephony server TS of the local area network LAN on the other. Building and maintaining two overlapping communication networks is naturally costly.

The problem of overlapping communication networks is made worse by the rapid growth in the number of portable mobile stations utilizing radio communication. Because of mobile work, many office workers need a mobile phone and often also a portable fax and/or a combination of a portable computer and a mobile phone. To make these devices useable also inside buildings, where the structures attenuate radio signals, it has been proposed, for example, that the mobile communication network be supplemented with small base stations covering an office or even a room in an office, which would be connected either directly or via a wired telephone network to the switching systems of the mobile network. That network of small base stations would constitute a third overlapping transmission network in an office, and therefore it is clear that in an advantageous solution, at which the present invention is aimed, an arrangement which supports radio communication devices should be realized by substantially the same means as the rest of the communications in the office.

It is a challenge for the communication systems that more and more work is being done in the small office, home office (SOHO) environment. There, too, there is often a need for advanced office communication services, and it is particularly advantageous if there is a flexible system which can be used both in the office and at home. The present systems, which require overlapping connections for the mobile communication services, ordinary telephone services and fast data transmission services, are rather inflexible as far as working in a small or home office is concerned.

To describe the prior art we will next briefly discuss some solutions related to integrated communication systems. PCT application document WO 94/14291 discloses an arrangement the purpose of which is to simplify and automatize the use of services ordered by phone. The publication discloses an embodiment, wherein a user makes a phone call from a wired telephone to an automatic exchange and indicates with a push-button code that she wants to order a taxi. The number of said wired phone is automatically conveyed to the exchange which checks the location of the phone from a suitable database. Then the exchange checks from an (automatically updated) taxi database which taxi is geographically closest to the caller in question and can provide the desired lift. To update the taxi database and make connections to taxis, each taxi has a mobile station using radio connection. For transmission, the exchange and its auxiliary equipment, such as the unit answering calls, the databases and the base stations maintaining the radio links, are interconnected via a local area network which can transmit voice information in addition to data. Unlike the present invention, the system is not aimed at reducing overlapping communication networks, but its stated intention is to substitute computers for human labour in an exchange conveying taxi services.

EP application document no. 599,632 discloses a wireless local area network the purpose of which is to replace a current wired network (such as Ethernet and Token Ring, both registered trademarks) with a radio network, which in a way constitutes a cellular radio system of its own, intended for data transmission, inside a company. Said application document concentrates mainly on the handling of problems caused by multipath propagation in a wireless local area network and proposes a solution wherein the data transmission time constant of the system, or the inverse of the bit rate, is smaller than the typical delay caused by multipath propagation.

EP application document no. 462,728 discloses an intelligent base station controller which controls at least one base station of a radio-based communication system and which is capable of transmitting calls coming from a certain mobile station via a base station directly to a wired telephone network. The idea of the system is that since a call directed directly to a wired network does not utilize the database services of a mobile telephone exchange or the long transmission connections to the exchange, a lower price can be set for it. If the base station controller in question is located in a company's telephone exchange and its base stations cover the premises of the company, the method can be used to form a similar wireless local area network as the one described above in conjunction with EP document no. 599,632.

So-called, cordless systems, in which the fixed terminals of the conventional wired telephone network are replaced with corresponding radio-based devices, constitute a field of technology of its own. These systems have so far concentrated on standardizing the radio interface between the mobile terminal and the fixed station at the end of a wired connection. Known radio interface standards include, for example, DECT (Digital European Cordless Telecommunications) and CT2 (Cordless Telephone 2). They do not define the communication services offered to the user, but the services depend on the communication network (e.g. the public wired telephone network) to which the fixed station implementing the radio inter-face is connected.

Above solutions according to the prior art do not actually attempt to solve the aforementioned problem caused by the overlapping of networks required by different transmission formats. An object of this invention is to provide a system which combines all electrical communication within a given limited area and controls the communication directed out of said area and provides a chance to share data and data processing resources between several users. Another object of the invention is to provide an arrangement with which said communication-combining system can also serve home and small office users. A further object of the invention is to provide an arrangement like the one mentioned above in which the same equipment can be used everywhere as terminals of the communication system.

SUMMARY OF THE INVENTION

These objects of the invention are achieved through an arrangement in which the core of the communication system is a local area network in the office and a cellular radio network between office units. From the point of view of the cellular radio system, each office constitutes a cellular subsystem, in which a certain so called gateway computer controls the connections in the direction of the cellular radio system exchange and in which the local area network connects to said gateway computer a group of base units serving as radio base stations.

An integrated office communication system according to the invention, which includes a local area network, is characterized in that it also includes, connected to said local area network, gateway equipment to convey information between said local area network and a public cellular radio network, and low-power base station equipment to provide a radio interface for terminal equipment operating in a public cellular radio network, which radio interface is substantially identical with the radio interface provided by conventional base station equipment in said public cellular radio network, which, ie. the gateway equipment, local area network and low-power base station equipment, are arranged in such a manner that within the area of said office communication system a connection between said terminal equipment and said public cellular radio network is made via said low-power base station equipment, said local area network and said gateway equipment.

In the arrangement according to the invention, the local area network inside an office is used for all data transmission, whereby overlapping networks are not needed. The invention is based on the novel idea that since an office interconnected by a local area network constitutes an integrated subsystem comprising rooms, or cells, it can be connected via a gateway connection to form a component of the cellular radio system in the same way as an ordinary base station subsystem (BSS) which is controlled by a base station controller (BSC) and comprises several base stations (BS). However, the invention does not limit the external communication connections of the office to the cellular radio network. From the local area network there may be, in addition to the cellular radio network connection provided by the gateway machine, also other communication connections to the outside world, such as a connection to a wired telephone network or an asynchronous transfer mode (ATM) network.

Nanocells are created in the office that cover one or a few rooms and that have a special very low power base station for serving ordinary terminals of a cellular radio system. The base stations are connected via a local area network to each other and to a gateway machine which provides the necessary data transfer from the local area network to an exchange in the cellular radio system. It is also possible to connect infrared stations to the local area network which operate in the same way as the low-power radio base stations of the nanocells except for that instead of a radio link the connection to a terminal is made via an infrared link. In addition, stations applying cordless standards (such as DECT) can be connected to the local area network, whereby also terminals of cordless systems can be used in the office. Usually the local area network has advantageously one or more servers which take care of certain functions related to the distribution of resources, such as the database services and voice mail and e-mail services.

For home and small office users and remote working, the communication system according to the invention advantageously comprises a nanocell in the user's home with a connection to the local area network in the office. The connection can be realized in many ways. The most advantageous way is to use an existing connection in the user's home, such as the twin lead connection of the conventional telephone network. If the user's home is provided with a coaxial cable of a cable TV system, the transmission capacity required can be leased from the cable TV company. In the future, as ATM and ISDN networks will become more widely used, these can be used especially to implement home connections requiring high bit rates. From the local area network in the office there is a bridge connection to the network realizing the home connection; the implementation of the bridge connection will be discussed in more detail later. If the user's home or small office is provided with many alternative connections, the user can advantageously choose which of the connections to the local area network in the office she wants to use.

BRIEF DESCRIPTION OF THE DRAWING

The invention is described in more detail with reference to the advantageous embodiments presented as examples and to the accompanying drawing, in which.

Above, in conjunction with the description of the prior art, we referred to FIG. 1 and so, below, in the description of the invention and its advantageous embodiments, we will refer mainly to FIGS. 2 to 4. In the figures, like parts are denoted by like reference numbers and letters.

DETAILED DESCRIPTION OF THE INVENTION

Figure 1:
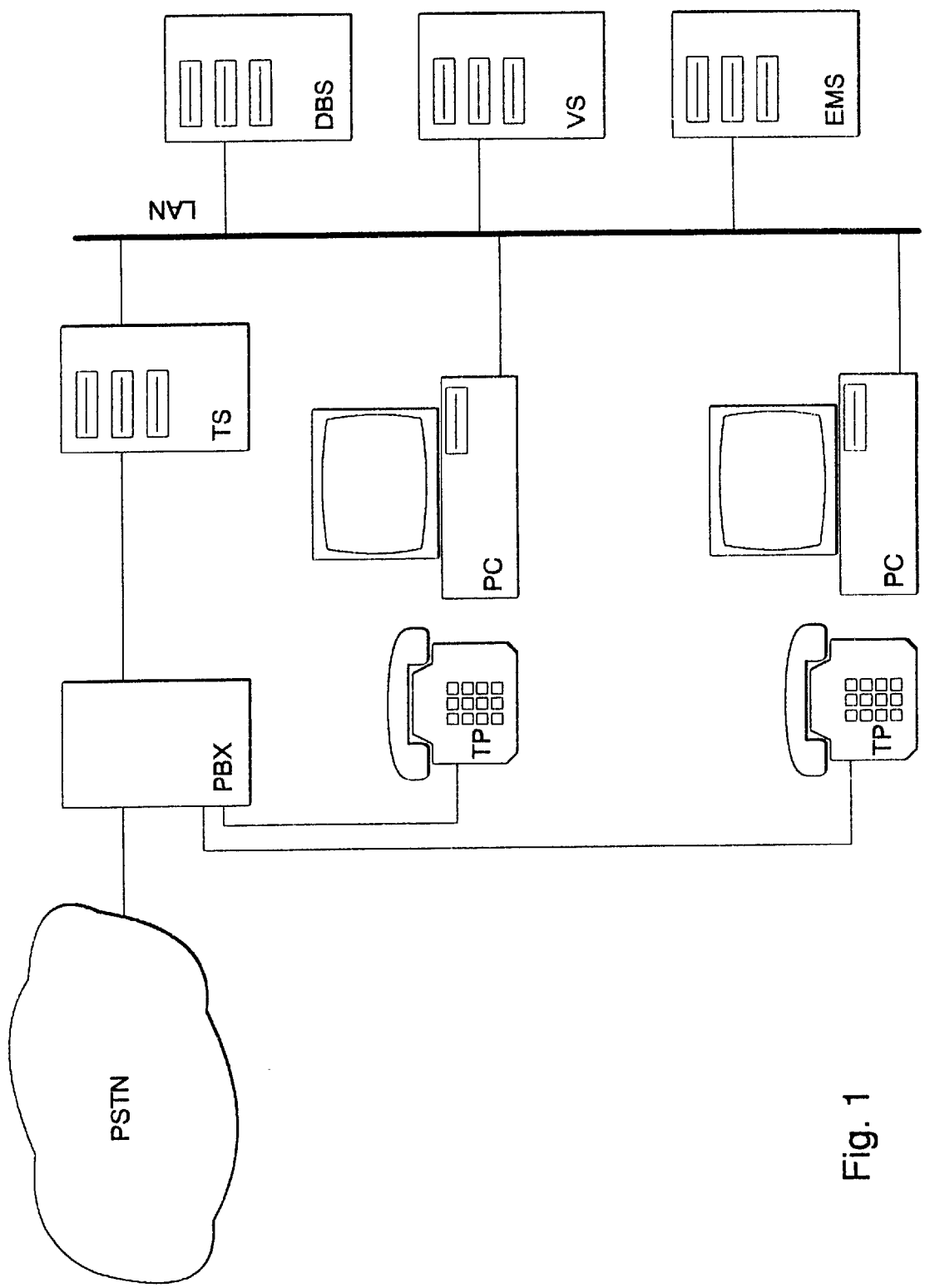
FIG. 1 shows a known communication arrangement in an office environment.
Figure 2:
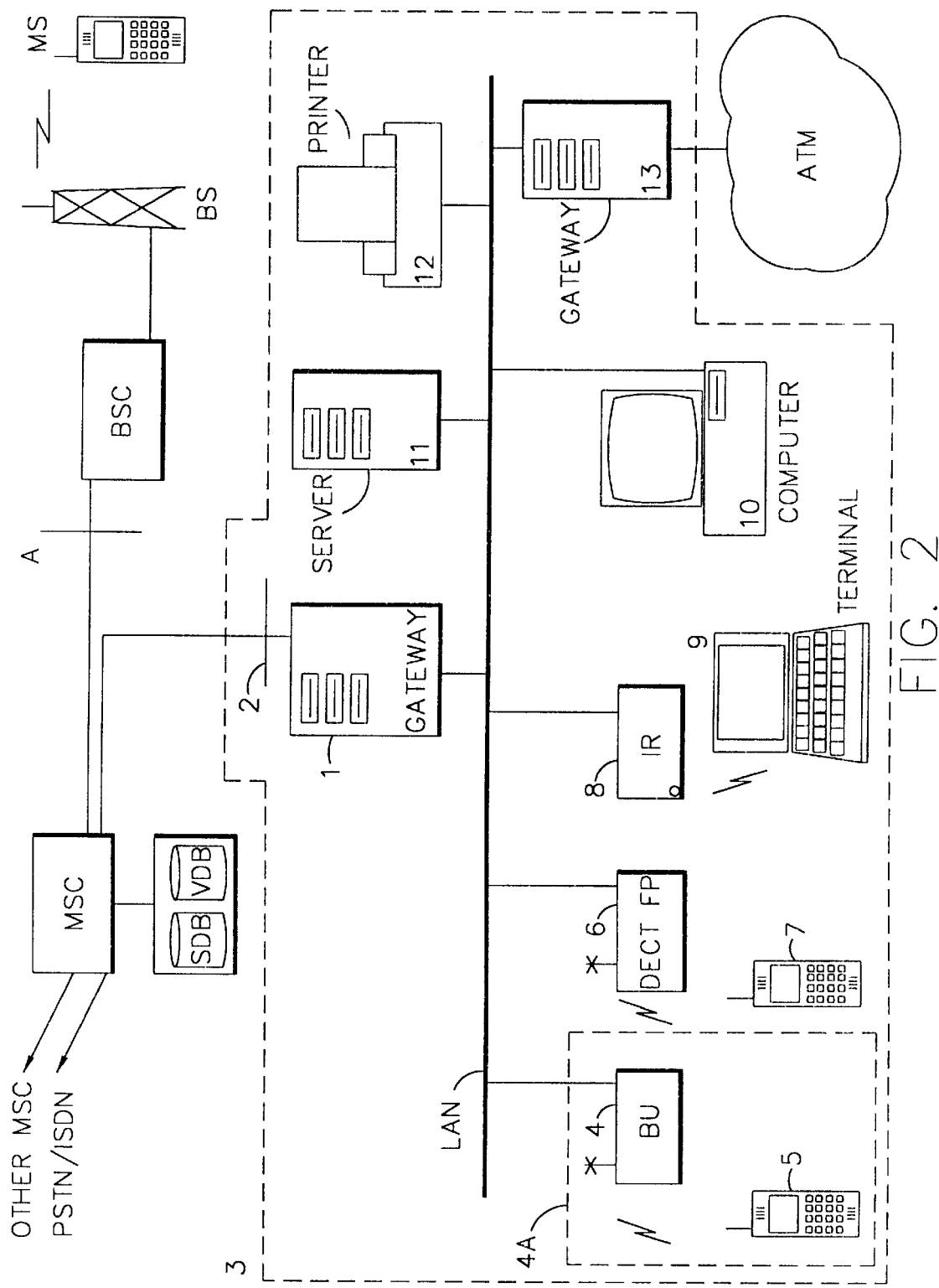
FIG. 2 shows the communication system according to the invention especially from the office environment standpoint.

FIG. 2 shows the communication system according to the invention especially from the office environment standpoint. In the figure, parts belonging to the office environment are separated from the other parts of the system with a dashed line. To illustrate the operation of the system we will first discuss parts not belonging to the office environment, which, as such, are known and belong to standardized cellular radio systems. In the description below, which discloses a cellular radio system, we will use, for the sake of illustration, names used in the GSM (Groupe Speciale Mobile) system, which is widely used in Europe, but they are in no way intended to limit the applicability of the invention to any one particular cellular radio system.

The operational nucleus of a cellular radio system is constituted by the mobile switching centres MSC in connection of which there are databases such as the subscriber database SDB and visitor database VDB for storing and using information related to the location and status of mobile stations. Under one MSC there are several base station controllers BSC, each of which controls one or more base stations BS. In the GSM system, the standardized interface between a switching centre MSC and base station controller BSC is called an A-interface.

A mobile station MS in a cellular radio system is in radio connection with a base station BS, whereby the base station conveys the location and status information of that mobile station to the database means SDB or VDB in a switching centre MSC depending on whether the mobile station belongs to the subscribers of the area in question or whether it is a visitor in the area. The switching centre MSC uses the stored data for controlling paging messages directed to individual mobile stations. The base stations constitute location areas (LA) which represent the accuracy with which the location of a mobile station can be determined. When a mobile station MS moves from a location area to another, its location information is updated and the handling of the connection to the switching centre MSC is transferred to a base station BS in the new location area with a handover function.

Next, we will discuss those parts in FIG. 2 that are located in the office environment and that constitute an entity according to the invention in the embodiment depicted in the figure. Inside the office, all communication occurs via a local area network LAN. The gateway computer 1 shown in the figure acts as a link between the local area network LAN and a mobile switching centre MSC. The interface 2 between the gateway computer 1 and the mobile switching centre MSC complies with the same A-interface standard that defines communication between ordinary base station controllers BSC and a mobile switching centre MSC, and therefore, from the point of view of the switching centre, the gateway computer 1 is just as any base station controller. Alternatively, the interface 2 between the gateway computer 1 and mobile switching centre MSC can be implemented as a DSS. 1+ interface, as soon as the standardization for this new interface is completed. The new interface definition means primarily that certain protocol conversion tasks are transferred from the mobile switching centre MSC to the gateway computer 1. From the point of view of the switching centre all communication operations occurring under the control of the gateway computer 1 occur in a certain location area 3 corresponding to the office in question. It could also be said that from the point of view of the switching centre the systems operating under the gateway computer constitute a base station subsystem (BSS).

The interface between the gateway computer 1 and the local area network LAN depends on the implementation of the local area network and on the protocols and application programming interfaces (API) used for maintaining local area network traffic. Known network protocols include e.g. TCP/IP (Transmission Control Protocol/Internet Protocol) and Novell Netware SPX/IPX (Sequenced Packet Exchange/Internetwork Packet Exchange). A known API interface is e.g. NetBIOS (Network Basic Input/Output System).

A wide variety of equipment can be connected to the local area network LAN in an office. Low-power base units 4 (BU) serving one or a few rooms are essential from the point of view of the invention. These are small base stations that constitute a coverage area consisting of nanocells, covering the whole office. Each base unit 4 includes a network adapter part (not shown in the drawing), which is similar to known network adapter cards widely used in computers and which takes care of the practical implementation of the communication between a base unit 4 and the local area network. Thus, a nanocell 4a refers to the coverage area of a base unit 4, which is a miniaturized equivalent of the coverage area of a base station BS in an ordinary cellular system. In an advantageous embodiment, each base unit 4 operates on only one transmission and one reception frequency, whereby one base unit can simultaneously serve a maximum of seven mobile stations 5—when applying an 8-channel time division multiple access (TDMA) known from the GSM system, wherein one channel is reserved as a control channel. For the useability of the system it is essential that except for the transmission power the radio interface offered to mobile stations 5 by the base units 4 is identical with the radio interface offered by an ordinary base station BS so that the system sets no additional requirements on existing mobile stations.

Base units 4 can handle the communication required by all those mobile stations 5 that use the radio interface according to a public cellular radio system and which therefore can be used also outside the office environment in a coverage area of the public cellular radio system. These devices include e.g. mobile phones, portable fax machines, and computers utilizing a digital communication connection formed by means of a data adapter. Base units 4 offering different radio interfaces can also be connected to the same local area network for those users who use mobile stations according to the DCS 1800 standard, for example.

Usually, however, it is not economical to purchase relatively expensive mobile phones for office employees if they need the telephone connection only within the office area. Then a more advantageous solution is to connect base units 6 complying e.g. with the radio interface standard of a cordless telephone system, such as DECT, to the local area network LAN, and thus create through these base units a cordless telephone connection for the whole office area, utilizing cordless telephones 7, which usually are cheaper than mobile phones. Compared to a conventional wired telephone system, this has the advantage that, firstly, there is no need for a separate office telephone network since the base unit 6 of the cordless telephone system is connected to the same local area network LAN as the other communication devices in the office. Secondly, an employee can be reached throughout the whole office area if she keeps the cordless phone with her, which is clearly an improvement when compared to the use of wired telephones. The base units 6 of a cordless telephone system are also provided with network adapter parts for local area network traffic.

In certain cases it is desirable to use terminals in which the communication is based on an infared link. Thus brings certain advantages, e.g. that outside the direct visibility range the infrared link does not interfere with other similar connections and that the IR link does not reserve any radio frequencies. For these connections, it is possible to connect infrared base units 8 to the local area network LAN through which the communication required by terminals 9 using the infrared connection is directed to the local area network LAN.

Naturally, in the implementation according to the invention it is possible to connect users' computers 10, servers 11, printers 12 and other such known network-compatible devices to the office's local area network LAN directly via wired connections. Particularly it is possible to connect to it gateway computers 13, which connect the local area network LAN to various public communication networks, such as a public wired telephone network, digital ISDN network, cable TV network or a public ATM network. Gateway computers and said other communication networks are especially used to arrange connections between home and small office users and the local area network in the office. We will discuss this later.

Above, we have used the term 'local area network' in its current sense (e.g. registered trademarks Ethernet and Token Ring). However, the transmission capacity of these known implementations is quite limited and therefore we have reason to assume that in the future corresponding transmissior-channels internal to a working environment will be realized as ATM connections or using other fast transmission methods. This will not result in changes in the architecture of the communication system according to the invention because the invention is not confined to any particular network implementation.

Figure 3:
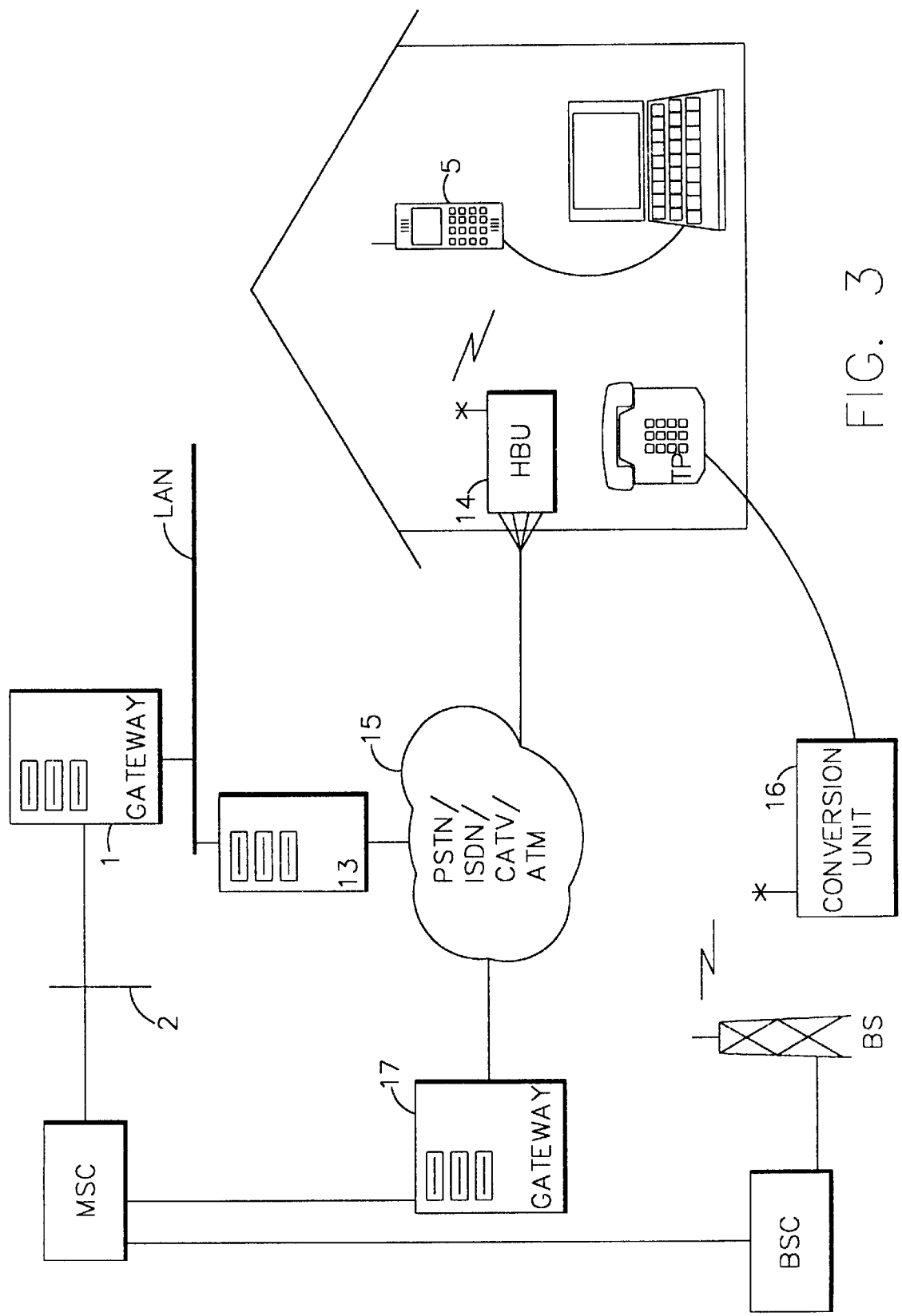
FIG. 3 shows the communication system according to the invention especially from the home or small office environment standpoint.

FIG. 3 shows a home environment HE wherefrom the user has a connection to the local area network in the office in the manner according to the invention. The home environment includes a home base unit 14 (HBU) which is similar to those used as base stations for the nanocells 4a in an office environment. The home environment forms a special nanocell for the terminals 5 in the home environment, which nanocell can be placed in the system hierarchy under the control of the gateway computer 1 in the office and thus in the same location area as the base units in the office although it is located physically apart from them. FIG. 3 also shows a bridge-type gateway computer 13 which handles traffic between a public communication network 15 (not specified in the figure) and the local area network LAN in the office. The home base unit 14 is connected to the public communication network 15 which can be e.g. a wired telephone network, ISDN network, cable TV network (CATV) or an ATM network. It is advantageous to use a network which is already linked to the home environment, whereby the application of the system according to the invention will not require the building of a new link.

The home environment HE may also communicate with places other than the local area network LAN in the office. An ordinary wired phone TP may be connected to a wired telephone network or via a local conversion unit 16 to the nearest base station BS of a cellular radio system and via it and a base station controller BSC to a mobilet switching centre MSC. In addition, the home base unit 14 may advantageously set up a connection via a public communication network 15 to any place available through it, e.g. via a special gateway station 17 to a mobile switching centre MSC.

Next, we will discuss the practical implementation of elements in the system according to the invention and the characteristics required of them. The gateway computer 1 must interconnect two very different communication networks, a local area network LAN and a cellular radio network, in this case a GSM network. From the point of view of the mobile switching centre MSC, the gateway computer 1 should operate just like a base station controller BSC and it has to carry out the necessary protocol conversions between the GSM protocol and the protocols applied in the local area network LAN. Furthermore, as it operates as a base station controller between the base units 6 and the mobile switching centre MSC, it performs the conversions between the A- and Abis-interfaces defined in the GSM standards.

The gateway computer 1 also has to perform other protocol conversions if the local area network LAN is connected to base stations other than those handling information arranged according to the GSM standards. However, these conversions can also be carried out in the base units themselves, which means that even if a base unit 6 offered a DECT radio interface to terminals 7, it can itself convert all information coming from the terminal 7, first into the GSM format, and then encapsulate it into a form required by the local area network LAN. This reduces the load of the gateway computer 1, since it only has to perform conversions between information encapsulated in the LAN format and information in the GSM format. The details of conversions between different standards, such as DECT and GSM, are known to one skilled in the art. Delays caused by conversions and by the operation of the local area network in general must be taken into account especially when setting up a telephone connection between a terminal 5 and an external terminal.

The gateway computer also has to be able to keep an up-to-date record of operational base units 4 connected to the local area network LAN. In this respect, its operation differs from that of an ordinary base station controller, as ordinary base stations are continuously on and the list of base stations in an ordinary base station controller is updated only when a new base station is installed or an old one is removed. In the office communication system according to the invention, wherein the base units 4 are advantageously room-specific, the users may arbitrarily switch them on and off, thereby continuously changing the situation from the point of view of the gateway computer 1.

The gateway computer 1 is responsible for all mobility, call control and handover functions within the location area 3 under its management. Thus, the public cellular radio network is not burdened with a huge traffic load that would be caused by the great number of nanocells and by monitoring mobile station locations with the accuracy of a nanocell. There has to be a way to route intra-office calls so that they are not unnecessarily directed to the public cellular radio network. This requires that the gateway computer 1 includes certain database means (not shown) of its own, which operationally correspond to the databases SDB and VDB utilized by the mobile switching centre MSC. Assignment of telephone numbers and billing are carried out by the network operator that maintains the public cellular radio network. In other aspects, too, users registered in the office communication system according to the invention have access to the same network services as other registered users of the public cellular radio network.

The office communication system according to the invention can be expanded by adding a second gateway computer (not shown). From the point of view of the public cellular network this can be arranged in two ways. Firstly, a whole new base station subsystem (BSS) can be established under the new gateway computer, thereby creating two parallel systems similar to those in FIG. 2. From the point of view of the office communication system this is the simplest way, but it has the disadvantage that since there are two base station subsystems in one office, the calls between them have to be directed via a mobile switching centre MSC. Another alternative is to make one gateway computer a master device and the other corresponding gateway computer connected to it a slave device, whereby each of them would have a location area of its own but they would belong to the same base station subsystem. In this embodiment, intra-office calls from one location area to the other are directed via the gateway computers without having to go through the mobile switching centre.

The base units 4 of the office communication system according to the invention correspond to the base stations of an ordinary cellular radio system, but in the advantageous embodiment described above the two differ in certain respects, and the differences are:

ability to switch operating voltage on and off, dynamic channel allocation, transmission power used, and mobility.

Since the base units 4 are located in users' rooms, they will be switched on and off from time to time either on purpose or accidentally. Communication between the base units 4 and the gateway computer 1 requires an arrangement similar to sign-in and sign-off messages, with which a base unit switched on indicates to the gateway computer that it is available or, respectively, a base unit switched off indicates that it is exiting the system.

Dynamic channel allocation at its purest means a situation in which each channel (frequency and/or TDMA time slot) is available in every cell of the cellular system. The channel with the least interference and least load at a given moment of time is selected for use. Usually, the cellular radio system exchange makes the decisions concerning channel allocation, but since in the system according to the invention the cell size is very small and correspondingly the number of cells is very big, this would lead to a very heavy computing load in the exchange. In an advantageous embodiment of the invention, channel allocation decisions are made in the gateway computer 1 and/or base units 4. In addition to the load distribution this method has the advantage that the system allocates radio frequency resources in a self-organizing manner. There is no need to restrict beforehand the allocation of RF channels regionally or base unit-wise.

In practice, it is hardly economical to build base units 4 and home base units 14 such that they could use any channel. However, they must have a selection range with a sufficient number of channels so that they will have choice even in the situation of presumed maximum traffic load. The RF part (not shown) of a base unit 4 and home base unit 14 measures the local interference level of the available channels that have been defied as the transmission channels of a terminal, and if the interference of a channel exceeds a certain threshold value, the channel will be temporarily removed from the group of selectable channels. If the interference level decreases below a second threshold value, the channel will be again included in the group of selectable channels. In an alternative embodiment of the invention, with a stricter compliance with the GSM practices, the base units 4 and 14 transfer the channel information needed for making the decisions to the gateway computer 1, whereby the dynamic channel allocation is performed one step higher in the system hierarchy.

If the office communication system according to the invention applies the DECT radio interface toward the terminal equipment, the dynamic channel allocation is performed according to the DECT standards in the mobile terminal 7 (in DECT terminology, the portable part, PP), and not in the fixed DECT base unit 6 (fixed part, FP), because in the DECT system the measurement of the channel interference level is performed on the terminal 7 side.

In the system according to the invention, determination of the RF power levels used in the physical implementation of the radio interface is based on measurements carried out by the terminals 5. When a new terminal is registered in a location area controlled by the gateway computer 1, the gateway computer selects for it a default power value which is the lowest possible allowed in the specification of the public cellular radio system. For example, GSM standard GSM 05.05 proposes that a network operator may choose the transmission power of a base station according to need. So, in the system according to the invention, the transmission power may be even 1 $\mu$W. The same standard discusses the terminal transmission power minimum and maximum values which depend on the classification of the terminal. In an advantageous embodiment of the invention, it is probable that the lowest possible power level, which is 3.2 mW, will be used most often. The decision on the power level is advantageously made in the base unit 4.

The small base units 4 and 14 used in the system according to the invention need not be fixed installations as long as they have a certain electrically defined address in the local area network LAN. If, for example, the local area network LAN is an Ethernet® network using TCP/IP protocols, a base unit 4 can be connected to any extension within the same network cluster if its IP address is unequivocally defined. The base unit 4 may indeed be called the user's personal base station, and these can be used to change the physical configuration of the office communication system in an almost arbitrary manner.

One way of physically implementing the base unit 4 is to use a PCMCIA (Personal Computer Memory Card International Association) card which is connected to the appropriate interface in the user's workstation or personal computer (PC). Then the base station can be easily moved to another place, if required; home, for example. Within the scope of the invention, the DECT base unit 6 can be implemented in the same way, and the interworking functions (IWF) required by it can be placed either in the user's computer or in the gateway computer 1.

The home base unit 14 is otherwise similar to the office base unit described above but as it can be possible that the connection from home to the office environment is selected from among a certain group of public communication networks, the home base unit 14 should include a switch for selecting the network, and the necessary protocol conversion functions to realize the connection via different networks.

Next, we will discuss the new aspects brought to the cellular planning by the office communication system according to the invention. Deciding the number, location and operational parameters of coverage areas and base stations is, generally speaking, a complex task, in which one has to take into account cost-effectiveness, optimization of capacity, radio wave range, perturbations in the propagation of radio waves, and the assumed traffic density. Different cellular systems have adopted different approaches.

For example, in the GSM system, the base station coverage areas are relatively large macrocells the radii of which range from 200 m to 35 km. The DCS 1800 system utilizes microcells, and the purpose of the small cell size (<1 km) is to achieve a good capacity especially in areas with high traffic volumes. However, in both systems it is difficult to achieve high-quality connections indoors, where the building structures attenuate radio waves. Furthermore, when the traffic volume increases, the limited number of available radio channels results in congestion and the system runs out of channels.

Above it was presented that the office communication system according to the invention utilizes a very small cell size and very low power levels. Cells covering one or a few rooms, implemented mainly indoors, are here called nanocells. Because of low power levels, the radio traffic in the nanocells does not interfere with the traffic of a broader, overlapping coverage area, and therefore a communication system based on nanocells can be built to overlap a macro- or microcell system. An arrangement in which a large coverage area contains several smaller coverage areas is called an umbrella phenomenon.

In addition, it was presented above that the nanocells utilize dynamic channel allocation, which means that the cellular planning need not be rigid. Base units 4 can be added to the system according to the invention as long as the resulting traffic density does not exceed the handling capacity of the gateway computer 1. If necessary, also gateway units can be added to the system, as described above.

The invention does not restrict the implementation of the radio interface of the office communication system because, according to the-invention, base units 4, 6 supporting different interfaces can be connected to the system. The table below shows characteristics of certain radio interfaces which advantageously are used in conjunction with the invention:

tion areas is defined as the home location area HLA of the user, and while in that area, the user benefits from certain advantages, such as cheaper call tariffs.

The office communication system according to the invention constitutes at least one location area LA. Generally, the location area size is determined according to the system capacity and efficiency requirements. Since the location of each terminal is determined in the system with the accuracy of a location area, the area size affects especially on the amount of traffic that is needed for updating the locations of terminals and conveying a paging message to a particular terminal. If an office constitutes one location area, a paging message to any terminal in the office area must be sent via all base stations, whereby all terminals will decode all paging messages. The other extreme-alternative is that each nanocell constitutes a location area of its own, whereby a paging message to a certain terminal is sent via one base unit only. In the latter alternative, the location databases maintained by the gateway unit must be continuously updated as the users walk around the office with their mobile phones. Of course, from the terminal power saving point of view, transmitting paging messages in one cell only is the better option, because then one terminal has to decode only a small number of paging messages.

The location areas can also be defined as a compromise between the two extreme alternatives discussed above, whereby each location area comprises a few nanocells. If a company has several offices in various locations, it may make an agreement with the network operator upon certain benefits for the employees of the company for the location areas of all offices or just some of them.

In the system according to the invention, the mobility of the users and their terminals is monitored as follows: the gateway computer 1 monitors mobility inside the office communication system and the databases of a mobile switching centre MSC contain only the knowledge that the terminal is in the area controlled by a certain gateway computer. When a paging message is coming to the terminal, the switching centre MSC directs it to the gateway computer 1, which then directs it to be sent to those base units 4, 6 that constitute the location area in which the terminal is situated according to the location database of the gateway computer 1.

| System | GSM | DCS1800 | DECT |
| --- | --- | --- | --- |
| downlink | 935 to 960 MHz | 1805 to 1880 MHz | 1880 to 1900 MHz |
| uplink | 890 to 915 MHz | 1710 to 1785 MHz | 1880 to 1900 MHz |
| method of operation | TDMA/FDD | TDMA/FDD | TDMA/TDD |
| frequency spacing | 200 kHz | 200 kHz | 1897 mHz |
| channels per frequency | 8 | 8 | 12 |
| bandwidth | 25 kHz | 25 kHz | 576 kHz |
| modulation method | GMSK | GMSK | ADPCM |
| dynamic chann. allocation | no | no | yes |

The only changes made in these radio interface definitions in the system according to the invention concern the power levels as described above.

Figure 4:
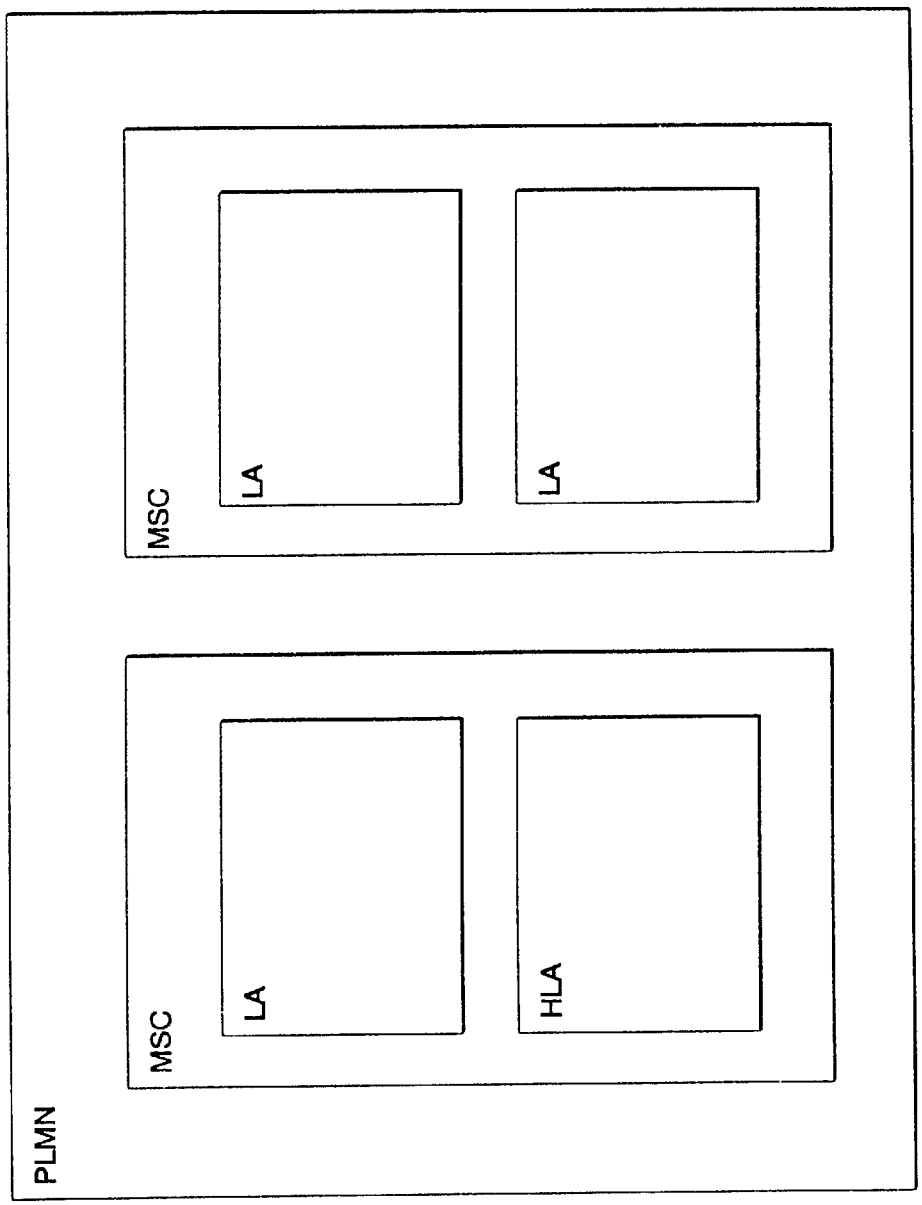
FIG. 4 shows known relationships between certain administrative areas.

Next, we will discuss the location and mobility monitoring, which is an essential part of all communications systems using mobile terminals. FIG. 4 illustrates known mutual relationships between the concepts PLMN (Public Land Mobile Network) area, MSC area, location area (LA) and home location area (HLA). The user is a registered user in the network area PLMN of a particular network operator. This area is divided into responsibility areas of several switching centres MSC, and each MSC area is further divided into location areas LA. Usually, one of these loca- The system according to the invention handles the security matters, ie. authentication and securing of privacy through encryption, with the same known manner that is applied in the public cellular radio system, or, in this case, the GSM system.

For call billing there are several options with which a company using the system according to the invention can e.g. make internal calls for free and only pay for outgoing calls or pay a rent to a network operator for those frequencies that are used as transmission frequencies for the nanocells and that therefore cannot be used simultaneously as base station frequencies for the base stations operating in that area. Billing can also be based, in addition to the actual calls, on the amount of signalling that does not contain voice or transmitted data but, for example, location data updates which are handled through the public cellular network and which thus result in costs to the operator.

Next, we will discuss handover functions, ie. changing the routing of an ongoing call when the user and her terminal move to the extent that the original route is not the best possible one in terms of connection quality. The system according to the invention aims at a situation wherein these functions could be performed, as much as possible, also through currently defined measures. Problems may arise from the fact that the system according to the invention can be adapted to operate at the radio interfaces of both the GSM and the DECT systems, the first of which specifies that a handover is carried out in a centralized manner by a base station controller (BSC) and the latter that it is carried out in a decentralized manner by the terminal. There are three specified types of handover functions: intra-BSC, inter-BSS and inter-MSC.

Since in the system according to the invention the gateway computer 1 corresponds to a base station controller of an ordinary cellular radio system, it takes care of all internal handover functions in the office, ie. those carried out in the area of its base station subsystem. Decisions on changing the routing inside the office are based on measurements that the terminals perform according to known standards regulating their operation, and data from those measurements are sent to the gateway computer 1 in the same way than to a base station controller of an ordinary cellular radio system. In addition, a base unit 4, 6 may inside a nanocell change the channel allocated to a particular terminal on the basis of measurements performed by the base unit itself or by the terminal.

From the point of view of the invention, inter-BSS and inter-exchange handover functions are identical in that the terminal crosses the administrative border between the office communication system according to the invention and the public cellular radio network. Then the handover function is performed in a known manner by the mobile switching centre MSC. If the system according to the invention is located in the coverage area of a public cellular radio network (cf. the umbrella phenomenon mentioned earlier), a new situation may occur in which the terminal is not moving, but because of the interference situation the connection quality would be better in a transmission via the public cellular radio network. In an advantageous embodiment of the invention, wherein the location area constituted by the office is used as the home location area of the terminal, it is more advantageous to transmit the call via the system according to the invention for as long as the connection quality can be kept satisfactory. Correspondingly, if a handover has been performed to a connection via the public cellular radio network, it pays to transfer the call back to the system according to the invention as soon as the connection quality becomes satisfactory.

Above we have used mainly the DECT system to represent a cordless communication system. However, application of the invention is not limited to any particular cordless system. Other alternatives are e.g. CT-2 (Cordless Telephone 2), WCPE, PHS, HiperLAN and Wireless ATM.

Above we have used mainly the GSM system to represent a cellular radio system. However, application of the invention is not limited to any particular cellular radio system. Other alternatives are e.g. DCS 1800, PCN, D-AMPS, JDC and PCS 1900.

Above we have used mainly the local area network to represent an office communication system. However, application of the invention is not limited to any particular local area network. Alternatives include e.g. Ethernet®, Token Ring®, ATM network, FDDI (Fibre Distributed Data Interface), SMDS and DQDB (Distributed Queue Dual Bus).

The invention presented here unites all electrical communication in a limited area called the office environment by directing it to one and the same local area nework, thereby making overlapping communication networks unnecessary in the office. Communication from this network to the outside world is carried out in a centralized manner via a so-called gateway computer to a public cellular radio network, thereby enabling centralized management of communications. In addition, the invention makes it possible to use in the office environment the same mobile and cordless stations that are used elsewhere in the coverage areas of the public radio networks built for them, whereby no separate office terminal equipment is needed in the office. As these equipments can also be used in the home and small office environments, from where it is also possible to make a special connection to the local area network in the office in the manner according to the invention, the system according to the invention also fulfills the objectives regarding home and small office use.

What is claimed is:

1. An integrated office communication system which comprises a local area network (LAN) for transferring information between devices of said office communication system, wherein the system also comprises, connected to said local area network:

gateway equipment (1) to transfer information between said local area network (LAN) and a public cellular radio network; and low-power base station (4) comprising a radio interface for communication with a mobile terminal (5) operative in a public cellular radio network, which radio interface is the interface of a base station of a public cellular radio network;

wherein the gateway equipment (1), local area network and equipment (4) of the low-power base station, are arranged in a manner such that in the area of said office communication system a connection between said terminal (5) and said public cellular radio network is made via said low-power base station equipment (4), said local area network and said gateway equipment (1), and wherein the mobile terminal (5) is operative to communicate with the base station of a public cellular radio network upon a locating of the mobile terminal (5) outside the office communication system.

2. The office communication system of claim 1, further comprising, connected to said local area network, a base station equipment (6) of a cordless communication system to provide an interface for terminals (7) of the cordless communication system.

3. The office communication system of claim 2, wherein said cordless communication system is one of the following: DECT (Digital European Cordless Telecommunications), CT-2, WCPE, PHS, HiperLAN, Wireless ATM.

4. The office communication system of claim 1, further comprising, connected to said local area network, an infrared base station (8) to provide an interface for terminals (9) using an infrared link.

5. The office communication system of claim 1, further comprising, connected to said local area network, users' personal computers or workstations (10).

6. The office communication system of claim 1, further comprising, connected to said local area network, a gateway equipment (13) to provide a connection between said local area network and a public wired communications network (ATM).

7. The office communication system of claim 6, wherein said public wired communications network is one of the following: public switched telephone network, integrated services digital network (ISDN) asynchronous transfer mode (ATM) network, cable television network.

8. The office communication system of claim 1, wherein, from the point of view of said public cellular radio network it constitutes one location area (LA) for the location of mobile terminals (5).

9. The office communication system of claim 1, wherein, from the point of view of said public cellular radio network it constitutes several location areas (LA) for the location of mobile terminals (5).

10. The office communication system of claim 1, wherein, from the point of view of said public cellular radio network it constitutes one base station subsystem (BSS) for the location of mobile terminals (5).

11. The office communication system of claim 1, wherein, from the point of view of said public cellular radio network it constitutes several base station subsystems (BSS) for the location of mobile terminals (5), and includes at least one gateway equipment (1) for each base station subsystem (BSS).

12. The office communication system of claim 1, further comprising at least one low-power base station equipment (14) to provide a radio interface for terminals (5) in its vicinity (HE), and the low-power base station equipment (14) is located substantially farther away from said office communication system than its other low-power base station equipment (4) and is connected to said local area network via a further gateway equipment (13) and a further public communications network (15).

13. The office communication system of claim 1, wherein said public cellular radio network is one of the following: GSM, DCS1800, PCN, D-AMPS, JDC, PCS1900.

14. The office communication system of claim 1, wherein the transmission power of said low-power base station equipments (4, 14) is from 1 $\mu$W to 1 mW, whereby the size of their coverage area indoors is one or a few rooms.

15. The office communication system of claim 1, said local area network is one of the following: Ethernet®, Token Ring®, ATM network, FDDI, SMDS, DQDB.

* * * * *